United States Patent [19]

Jacot-Descombes et al.

[11] 4,424,472
[45] Jan. 3, 1984

[54] PROGRAMMABLE ROBOT

[75] Inventors: Jacques Jacot-Descombes, Geneveys-sur-Coffrane; Jean-Luc Monnier, Neuchatel, both of Switzerland

[73] Assignee: Microbo, S.A., Switzerland

[21] Appl. No.: 309,265

[22] Filed: Oct. 7, 1981

[30] Foreign Application Priority Data

Oct. 10, 1980 [CH] Switzerland .................. 7568/80

[51] Int. Cl.³ ............................................ G05B 19/42
[52] U.S. Cl. .................................... 318/568; 364/167
[58] Field of Search ................ 318/568, 569; 364/167

[56] References Cited

U.S. PATENT DOCUMENTS

| | | | |
|---|---|---|---|
| 3,934,186 | 1/1976 | Hayakawa | 318/568 X |
| 4,025,838 | 5/1977 | Watanabe | 318/568 |
| 4,105,937 | 8/1978 | Tuda | 318/568 |
| 4,150,236 | 4/1979 | Engelberger et al. | 318/568 X |
| 4,163,183 | 7/1979 | Engelberger et al. | 318/569 |
| 4,187,454 | 2/1980 | Ito | 318/568 |
| 4,287,459 | 9/1981 | Dahlström | 318/568 |

*Primary Examiner*—B. Dobeck
*Attorney, Agent, or Firm*—Allegretti, Newitt, Witcoff & McAndrews, Ltd.

[57] ABSTRACT

For each degree of freedom of the robot and in the COMMAND mode (switch 32 in position II) the corresponding movable member 21 is moved by an actuator 20 in accordance with an error signal formed as the difference between a command datum C supplied from a register 27 and an actual position datum P supplied by a position sensor 26, the command data required from time to time being provided from a memory 28 via a circuit 34. For training the robot, the FOLLOW mode is selected by putting the switch 32 in position I and the command datum C is replaced by the position datum P, the value of which is periodically entered in the register 27 via a switch 33 which is periodically closed by pulses 35a from a pulse generator 36. When the robot is at a position to which it is to be trained, a switch 30 is closed to write the then contents of the register 27 in the memory 28 for subsequent use in the COMMAND mode.

8 Claims, 8 Drawing Figures

PROGRAMMABLE ROBOT

BACKGROUND OF THE INVENTION AND PRIOR ART

The present invention is concerned with programmable robots and, more particularly, robots in which the learning of a specific position, i.e. training, is effected by placing the robot in this specific position and then storing parameters of this specific position.

A programmable robot is known from U.S. Pat. No. 4,163,183 in which the training is effected in the following manner:

The robot is maintained in position by a control circuit in all degrees of freedom except one and is displaced automatically in the direction of this last degree of freedom so as to bring it, so far as this degree of freedom is concerned into a position to be taught. In the course of this displacement the robot is controlled by a speed-control means.

Thus, it is necessary to resolve the displacement of this robot as far as the position to be taught into several elementary displacements, each of which is obtained in the direction of one degree of freedom. This can result in an excessive increase in the time taken by the training phase. In addition, in this known robot, the training is rendered difficult in that it is necessary to keep the robot in position when it reaches a training position, in order to avoid the errors which could result from a movement beyond this particular training position.

Accordingly there exists a need for a programmable robot which can be displaced into a particular training position in a natural manner, that is to say, following a direct movement and not following a movement formed by a series of elementary displacements each effected according to one degree of freedom of the robot.

BRIEF SUMMARY OF THE INVENTION

The programmable robot according to the invention has at least one movable member which is displaceable with respect to a reference position in the direction of a corresponding degree of freedom and a control unit for each degree of freedom. Each such control unit comprises a sensor responsive to the position of the movable member with respect to the reference position to furnish a datum P representing that position. A control system produces a command datum C and the control unit is responsive to the positional and command data to calculate an error datum $\epsilon = P - C$ and produces a control signal the amplitude of which is a function of the error datum. An actuator is responsive to the control signal to displace the movable member with respect to the reference position, so as to tend to eliminate the error. The robot further comprises memory means responsive to a first external action to store a positional datum of the movable member and mode-selecting means responsive to a second external action for selectively putting the control system in a training mode according to which, at successive instants, the control datum is rendered identical with the positional datum, and following which this command datum is kept constant during the intervals of time between the said instants.

In other words, instead of completely suppressing the regulation of the robot for a single degree of freedom, as is done in the prior art according to U.S. Pat. No. 4,163,183, the present invention presupposes that, for at least one degree of freedom of the robot at a time, there is substituted for the normal control system according to which a command datum which remains constant is used for the calculation of the error, a special control system which uses for the calculation of the error a command datum which is, at successive instants (preferably periodically), made equal to the actual position of the robot. This command datum remains constant except at the said successive instants.

This special control system is very advantageous because it enables the robot to assume any desired position and to maintain itself in this desired position.

BRIEF DESCRIPTION OF THE DRAWINGS

The invention will be described in more detail, by way of example, with reference to the accompanying drawings, in which.

DETAILED DESCRIPTION OF THE PREFERRED EMBODIMENTS

Figure 1:
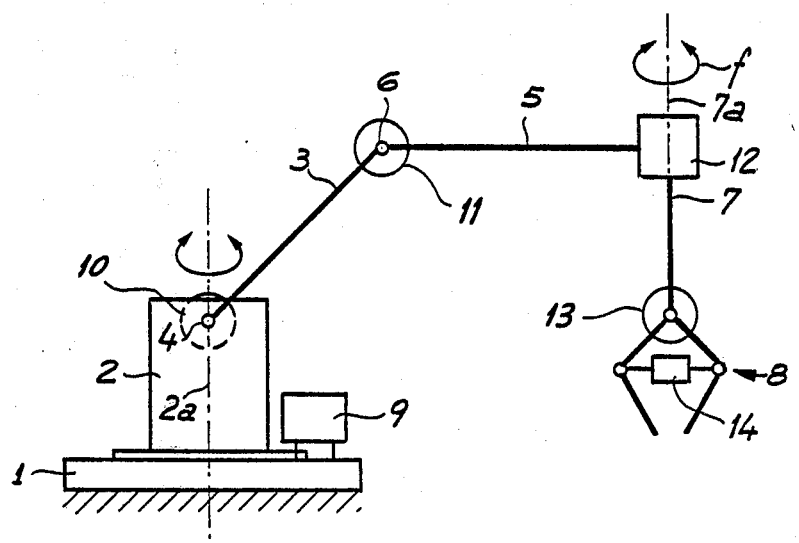
FIG. 1 is a schematic view in elevation of a robot to which the invention can be applied.

The robot shown in FIG. 1 comprises a stationary baseplate 1 on which a turret 2 having a vertical axis 2a is mounted for rotation about the axis 2a. On the turret 2 is mounted a job-boom comprising an arm 3 pivoted at 4 on the turret and a second arm 5 pivoted at 6 on the free end of the arm 3. The arm 5 carries in its turn, at its free end, a downwardly extending arm 7 terminating in a pair of tongs 8.

The assembly 7, 8 is mounted on the arm 5 so as to be able to rotate about the longitudinal axis 7a of the arm 7.

Motor units, namely motors 9, 10, 11, 12 and 13, effect the displacement of each element 2, 3, 5, 7 and 8 with respect to the elements 1, 2, 3, 5, 7 on which it is mounted. Each of these motors will be designated thereafter by the generic term "actuator," while each of the elements 2, 3, 5, 7 and 8 will be designated by the generic term "movable member." A hydraulic jack 14 controls the degree of closing of the tongs 8. Each actuator is associated with one degree of freedom of the robot and is operated by a control signal J produced as a function of an instructional datum C by a control system receiving a datum P representing the actual position of the robot with respect to this degree of freedom.

Figure 2:
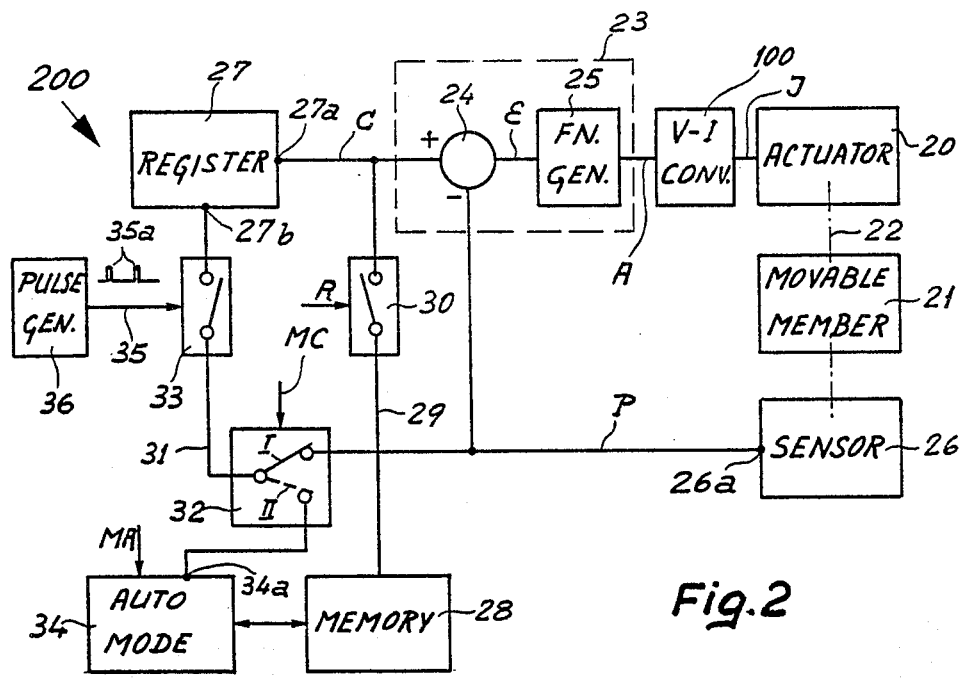
FIG. 2 is a block diagram of a control unit, which operates in the direction of one degree of freedom, of a robot according to a first illustrative embodiment of the invention.
Figure 3:
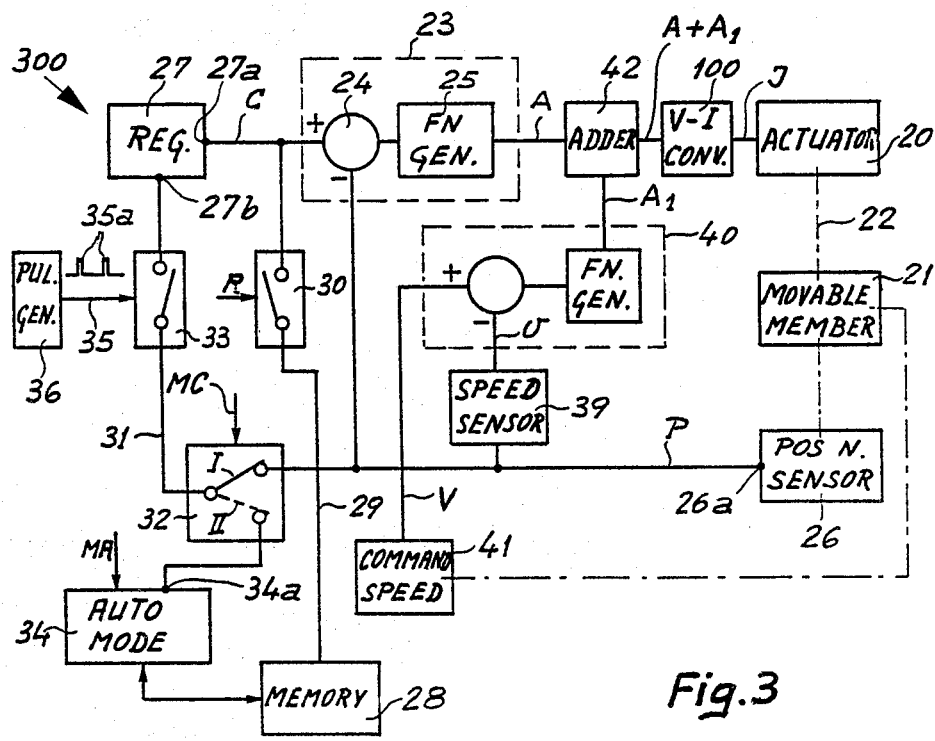
FIG. 3 is a block diagram of a control unit, which operates in the direction of one degree of freedom, of a robot according to a second illustrative embodiment of the invention.
Figure 5:
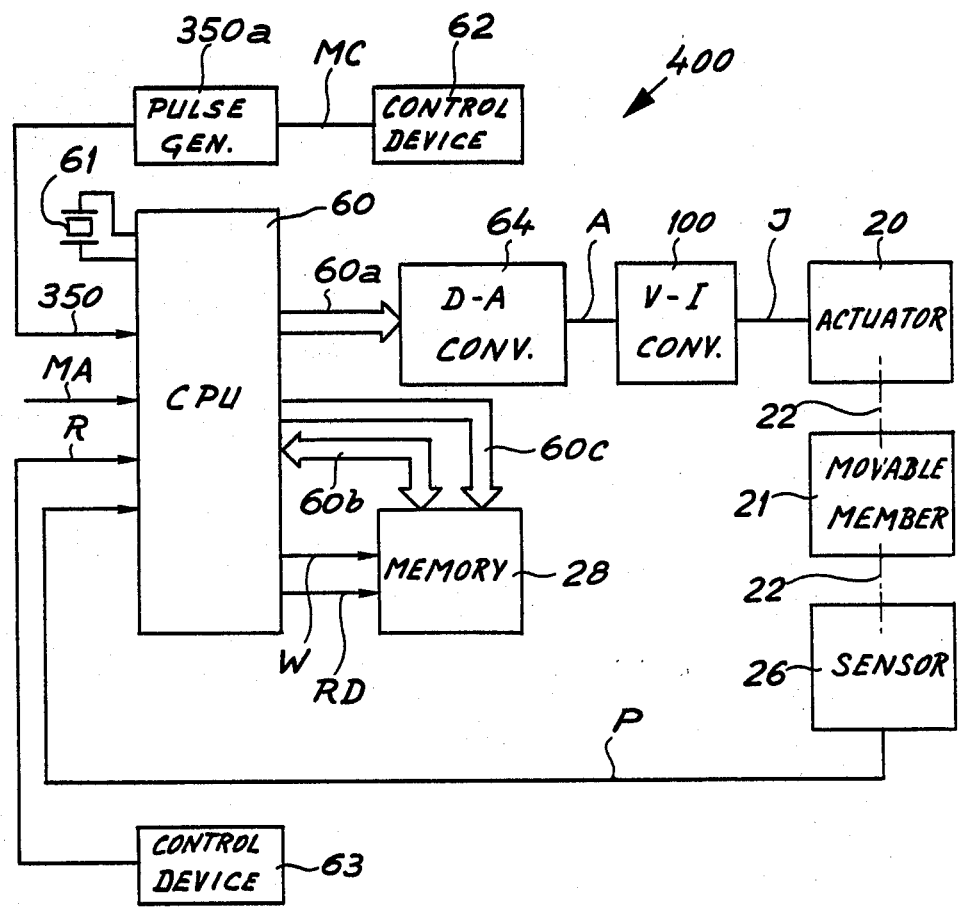
FIG. 5 is a block diagram of a control unit, which operates in the direction of one degree of freedom, of a robot according to a third illustrative embodiment of the invention.

Three different illustrative embodiments of the control system according to the invention have been shown in FIGS. 2, 3 and 5. In these figures, the actuator is designated by the generic reference 20.

As can be seen in FIG. 2, the displacement of a movable member bearing the general reference 21 is effected, in the direction of a degree of freedom symbolized in the drawing by a chain-dotted line 22, by an actuator 20 in response to a control signal J provided by a control circuit 23. The control circuit 23 comprises an adder circuit 24 which calculates an error datum $\epsilon = P - C$, from, on the one hand, a datum P representing the actual position of the movable part 21 with respect to the movable part on which it is mounted and on the other hand, a command datum C. The control circuit comprises in addition a second circuit 25 responsive to the error datum $\epsilon$ furnished by the circuit 24 to emit a control voltage signal A the amplitude of which is a function f of the error. This function f is of the form: f $$f(\epsilon) = a_1 + a_2\epsilon + a_3 \frac{d\epsilon}{dt} + a_0 \int \epsilon \, dt$$

where $a_0$, $a_1$, $a_2$ and $a_3$ are constant parameters.

The signal A, being a voltage signal, is converted into a current signal J by a voltage/current converter 100. The actuators 20, in this example, are electric motors which provide a torque proportional to the current J which they receive.

The datum P is furnished by an incremental position sensor 26 which measures the position of the movable part 21 with reference to the movable part on which it is mounted and which produces at its output 26a a digital signal representing the said position of the movable part. The command datum C is supplied by a working register 27.

The control unit shown in FIG. 2 comprises in addition a memory 28 for storing, in response to a signal R, the value of the instruction contained in the register 27. For this purpose, the memory 28 is connected to the output 27a of the register 27 by a lead 29 in which is interposed a switch 30 the closure of which is brought about by the above-mentioned signal R.

The output 26a of the position sensor 26 is likewise connected to an input 27b of the register 27 by a lead 31 in which are interposed in series a changeover switch 32 and a make-and-break switch 33.

The switch 32 is responsive to the state "1" or "0" of a mode controlling signal MC to assume either a first position I shown by a continuous line in FIG. 2 and corresponding to a first or training mode called the FOLLOW Mode, or a second position II shown by a broken line in this figure and corresponding to a second mode called the COMMAND Mode.

In the position I, the switch 32 connects the input terminal 27b of the register 27 to the position sensor 26, provided that the switch 33 is closed. In the position II, the switch 32 connects the input terminal 27b of the register 27 to a processing unit 34 which furnishes at its output, in response to the state "0" of a signal MA, a command datum C. This command datum is a fixed datum which is, for example, a positional datum previously stored in the memory 28.

The unit 34 is designated to furnish at its output 34a, in response to the state "1" of the signal M, a state corresponding to a third mode called the AUTOMATIC mode, or play back mode, a temporal sequence of command data C, each representing a stage in a process of movement of the robot. Since the AUTOMATIC mode does not form part of the invention, it will not be further described here.

The switch 33, which is normally open, is closed by each pulse 35a of a periodic signal 35 supplied by a circuit 36.

For each degree of freedom 22 of the robot, there is a corresponding control unit such as that which is shown by reference 200 in FIG. 2. A single generator of the signal MC, a single generator of the signal R and single generator of the signal MA can be used for several or all of the degrees of freedom. Thus, a single signal MC is applied to the switches 32, a single signal R is applied to the switches 30 and a single signal MA is applied to the processing units 34, these switches and processing units being shared by several, indeed, all of the control units of the robot. The generator of the signal MC and that of the signal R may each be constituted by a pedal having a return spring which urges the pedal towards the position thereof for which the signal MC or R, as the case may be, is in the zero state.

The robot is caused to assume a particular position, for example, a particular position of the tongs 8 (FIG. 1), in the following manner: the control units of the robot are set in the FOLLOW Mode by applying to the switches 32 a signal MC at level "1", thereby effecting connection between the input terminal 27b of the register 27 and the output 26a of the sensor 26, provided that the switch 33 is closed. The robot (the tongs 8) is then displaced, for example by hand, following the movement that is considered to be most convenient, until the robot reaches a particular position to be taught. At this moment, the operator applies to the switch 30 a signal R at level "1" enabling writing in the memory 28 of the positional data P concerning this particular position.

In order to displace the robot so as to cause it to assume a particular position, it is necessary to overcome, for each degree of freedom, the force developed by the corresponding actuator 20 which is responsive to the control signal J. Indeed, even when the robot is operating in the FOLLOW mode, this signal J is not of zero amplitude since the command datum C is rendered equal to the positional datum P only on the appearance of each pulse 35a which closes the switch 33. Thus, during the interval between two successive pulses 35a, the error can be different from zero as the robot is displaced.

Moreover, even at instants that coincide with the appearance of a pulse 35a, i.e., at instants when the value of the command C is made equal to the value of the position P, the amplitude of the control signal J generally differs from zero. In fact, this amplitude being a function f of the error $\epsilon$, namely a function containing an integral term, the amplitude of the control signal J is equal, at the moment when the signal MC is switched to the state "1", to a value such that the actuator 20 develops a force sufficient to compensate for the static forces, for example, the forces due to gravity, are applied to the movable member 21. The presence of the integral term in the function f accordingly produces an appreciable advantage particularly in the case where the robot is subjected, in its normal operating conditions, to considerable static forces. By "static force" is meant any force which is constant or varies slowly in the course of time and which is applied to the movable member 21 of the robot.

The function $f(\epsilon)$ is generated by the circuit 25 which may be constituted by an analogue or digital calculator.

It is advantageous to give to the constants $a_0$, $a_1$, $a_2$ and $a_3$ values such that the control signal J leads to the development by the actuators 20 of a force sufficient to keep the movable parts 21 of the robot in position, the signal MC being in the state "1". If, as is usual, the movable parts of the robot are subjected only to static forces, it is sufficient to give the constant $a_0$ a value sufficiently great to produce a resistance to the movement of the robot, this resistance being similar to that which would be obtained by friction produced at each degree of freedom of the robot. Due to this effect, the robot will remain in the position in which it will have been placed; this considerably increases the convenience of handling of the robot during the "training" phase.

According to the example described with reference to FIG. 2, the robot is moved by hand until it occupies the particular position that it is desired to teach it.

There are, however, cases in which, when the control unit is operating in the FOLLOW mode, that it to say when the signal MC is in the state "1", the force developed by the actuator 20 is sufficiently high to prevent any manual displacement of a robot. In this case, use is preferably made of special control means which will be described below with reference to FIGS. 3 and 4.

In FIG. 3, the elements which are identical or similar to those of FIG. 2 are designated by the same reference.

The control unit shown by reference 300 in FIG. 3 differs from that of FIG. 2 in that it comprises, in addition, for each degree of freedom 22 of the robot, a sensor 39 of the speed of the movable part 21 and a second control circuit 40 responsive to the signal v emitted by the speed sensor 39 and to a signal V representative of a commanded speed, furnished by a generator 41 to generate a second control signal A1, the amplitude of which is a function f1 of the difference between the values of the signals V and v.

According to the example shown in FIG. 3, the converter 100 receives a control signal constituted by the sum of the signals A and A1, this sum being formed by an adder 42. The speed sensor 39 may be constituted by a differentiating circuit which forms the derivative with respect to time of the datum P furnished by the positional sensor 26.

Figure 4:
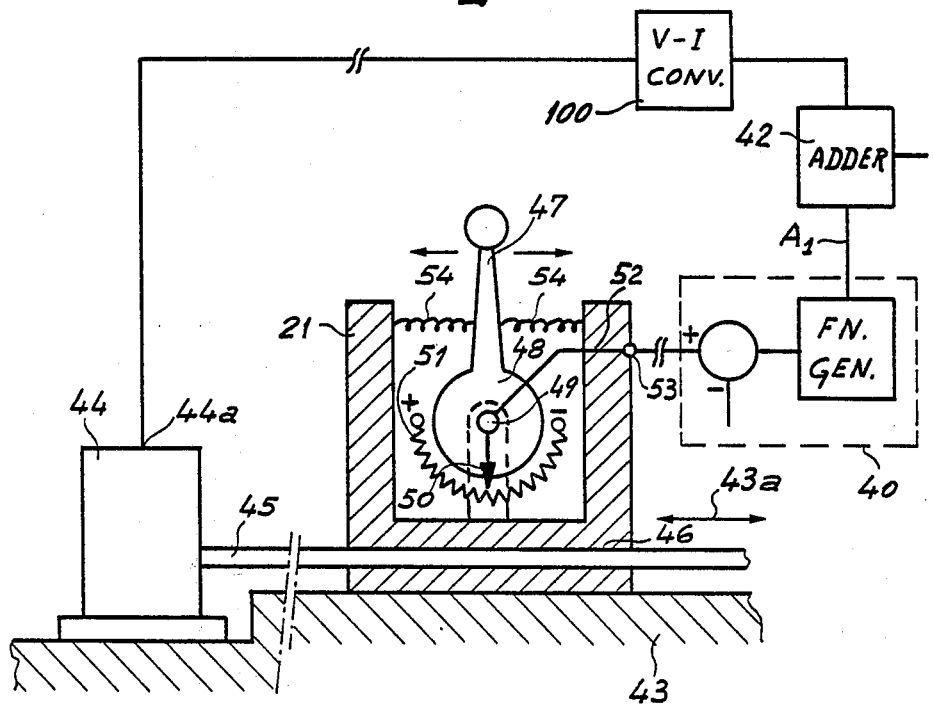
FIG. 4 is a schematic view in elevation and in vertical section showing constructional form of the generator of the speed of instruction signal which is used by the control unit according to FIG. 3.

FIG. 4 shows a constructional example of a command speed generator 41 utilized by the control unit of FIG. 3. The movable member 21 is mounted for displacement along a slide 43 by means of a motor 44 driving a lead screw 45 engaged in a screw threaded bore 46 in the movable member 21. A control lever 47 is provided on an element 48 which is mounted for rotation about a pivot pin 49 on the movable member 21. The pin 49 extends transversely to the direction 43a of the longitudinal axis of the slide 43.

The rotatable element 48 carries a contact 50 which forms the sliding contact of a potentiometer, the resistance 51 of which is connected between the positive and negative poles of a voltage source. The contact 50 is connected by an electrical lead 52 to an output terminal 53 from which the command speed signal V can be taken off.

The lever 47 is biased into a rest position such as that shown in FIG. 4 by two springs 54, each fixed between the lever 47 and the movable member 21, for applying to the lever 47 two opposing return forces perpendicular to the axis of rotation 49 of the rotatable element 48. The springs 54 are axially aligned with each other and extend parallel to the axis of the slide 43 and hence parallel to the direction of displacement of the movable members 21.

The manner in which the control unit of FIG. 3 and the generator 4 operate is as follows:

When the lever 47 is displaced, for example, to the right in FIG. 1, a positive command speed signal V appears at the terminal 53. This command speed signal is applied to the circuit 40 which in turn delivers a voltage control signal A1 that is applied to the adder 42. The latter responds to the signal A1 and to the signal A supplied by the circuit 23 to produce the signal A+A1 which is converted by the converter 100 into the current control signal J. This last-mentioned signal is applied to the supply circuit 44a of the motor 44 so that the motor 44 drives the lead screw 45 in the direction which permits the displacement of the movable member 21 towards the right in FIG. 4.

An opposite procedure will take place if the lever 47 is moved to the left in FIG. 4. Thus, movement of the lever 47 in a given sense brings about a displacement of the movable member 21 in the same sense.

The command speed signal V furnished by the device shown in FIG. 4 has an amplitude proportional to the angle through which the lever 47 has been made to pivot with respect to the rest position of the lever.

FIG. 5 shows a control unit 400 in which a processing system (CPU) 60 replaces the functional elements 23, 27, 30, 33 and 34 of the control units 200 and 300 shown in FIG. 2 and FIG. 3 respectively. Of course, as in the case of the control units shown in FIGS. 2 and 3, the robot is provided with one control unit such as is shown by 400 in FIG. 5 for each degree of freedom. In other words, the robot has as many control units, such as that which is shown by 400 in FIG. 5 or those which are shown by 200 and 300 in FIG. 2 and FIG. 3, as the robot has degrees of freedom.

The CPU 60 comprises a standard clock signal generator including an oscillator circuit and a quartz crystal 61. The CPU receives a pulse signal 350 which is furnished by a circuit 350a in response to state "1" of a mode control signal MC furnished by a pedal-operated control device 62.

The signal 350 is applied to the INT input of the CPU 60, which input may, for example, be the RST 7.5 input of an 8085 microprocessor marketed by the company INTEL (United States).

Figure 5A:
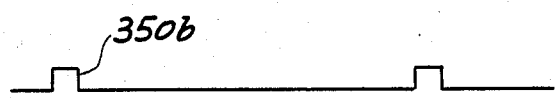
FIG. 5a shows an explanatory waveform.

The signal 350, the form of which is shown in FIG. 5a, consists of a series of periodic pulses 350b.

The CPU 60 receives, in addition, an automatic mode signal MA furnished by a device (not shown), a recording signal R furnished by a pedal-operated control device 63 and a positional data signal P furnished by the positional sensor 26 associated with the movable member 21 and with the degree of freedom 22.

The CPU 60 produces a command datum C and then calculates the error $\epsilon = P - C$ as well as the function $f(\epsilon)$. The CPU 60, then transmits via its data bus 60a the bits representing the value of $f(\epsilon)$ to the input of a digital-to-analogue converter 64 which furnishes at its output the signal A which is applied to the voltage-current converter 100.

The CPU 60 responds to the "1" level of the signal R furnished by the control device 63 by applying to the memory 28 via a second data bus 60b the bits which corresponds to the command datum used at the moment when R switches to the state "1". Simultaneously, the CPU applies to the memory 28 an address signal via an address bus 60c as well as a write-enable signal W.

Figures 6, 7:
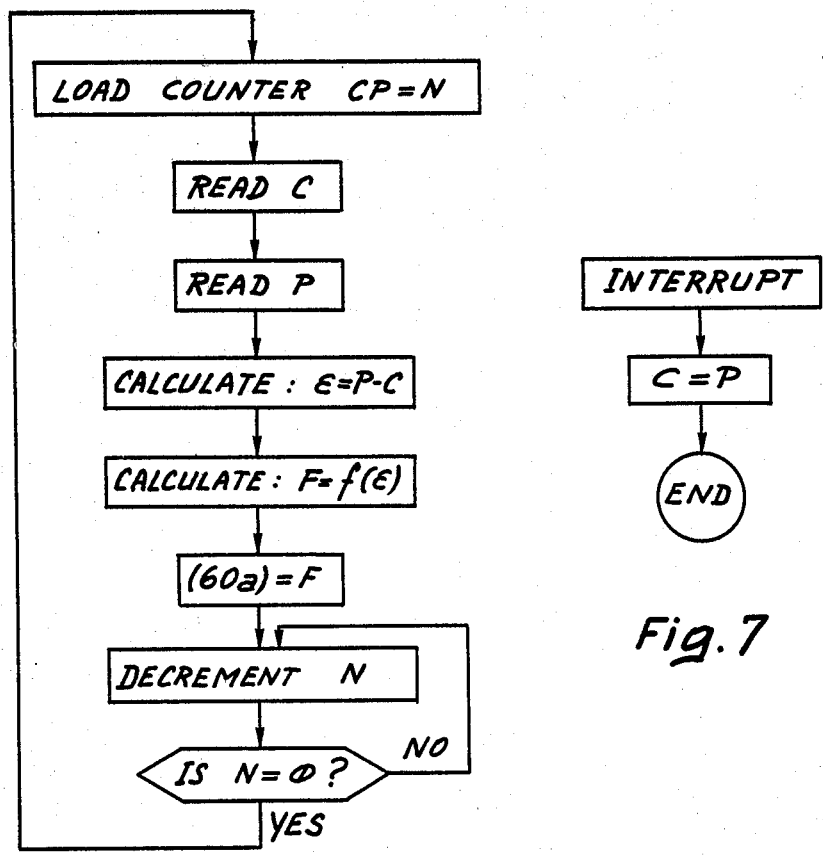
FIGS. 6 and 7 are flow charts of the programming of the processing system used by the control unit of FIG. 5.

According to one embodiment, the CPU 60 is designed to operate in accordance with programs shown in FIGS. 6 and 7.

According to the program of FIG. 6, the CPU 60 uses a counter CP which counts clock pulses obtained by dividing the CPU clock signal and it uses the datum P representing the position of the movable member 21 with respect to its reference datum point.

The CPU 60 likewise responds to the signal 350 in the following manner:

In the FOLLOW mode, the signal MC is at level "1". It can be seen from FIG. 6 that the CPU 60 calculates, each time the count N by the counter CP passes to the state "0", the value F of the function f($\epsilon$) and applies to the data bus 60a the bits corresponding to this value. The calculation is made with a command datum C contained in a register of the processing system 60. Each time a pulse 350b of the signal 350 appears, the calculating program according to FIG. 6 is interrupted and the command datum is made equal to the value of the positional datum P. These interrupts may take place, for example, at time intervals ten times as long as the time elapsing between two successive passages to zero of the counter CP.

The operation of the CPU also depends on the state of the signal MA. If this signal MA is at level "0", the CPU 60 operates in the manner that has just been described.

On the other hand, if the signal MA is at level "1", the CPU always operates according to the program of FIG. 6, but the command datum C may be modified according to a further program. Since this further program forms no part of the invention, it will not be described in detail; it programs the robot to execute a particular sequence of movements.

It will be understood that, in all cases (FIGS. 2, 3 and 5), the state "0" of the signal MC sets the robot in the COMMAND mode according to which the command datum used for the calculation of the error datum remains constant. In the case of the control unit of FIG. 5, in the COMMAND mode the register of the CPU containing the command datum receives no control datum so that, at each cycle of the program of FIG. 6 the same command datum C is read. This command datum is equal to the positional datum P produced by the sensor 26 at the appearance of the last pulse 350b of the signal 350.

It is apparent that modifications and changes may be made in the operation and structure of the invention as described above without departing from the scope of the invention. The description has been made only by way of example, and is not to be taken as limiting the invention.

What is claimed is:

1. A programmable robot, including at least one movable member which is displaceable with respect to a reference position in the direction of a corresponding degree of freedom and at least one corresponding control unit, said at least one control unit comprising a sensor responsive to the position of said movable member with respect to the reference position to furnish a positional datum representing said position of the movable member; a control system comprising means for producing a command datum and means responsive to said positional and command data to calculate an error datum and to produce a control signal the amplitude of which is a function of the error datum; an actuator responsive to said control signal to displace said movable member with respect to said reference position, so as to tend to eliminate the error; memory means responsive to a first external action to store said positional datum of the movable member; and mode-selecting means responsive to a second external action for selectively enabling a training mode of said control system wherein said command datum used for the calculation of said error datum is kept constant during each interval of time between two consecutive ones of successive instants, at each of them said command datum is rendered identical with said positional datum.

2. A programmable robot according to claim 1, which is displaceable according to several degrees of freedom, and wherein at least some of the control systems associated with different degrees of freedom are put simultaneously in the training mode by one and the same second external action.

3. A programmable robot according to claim 1, wherein said mode-selecting means are responsive to a third external action to put said control system in a command mode in which the command datum remains constant.

4. A programmable robot according to claim 1, wherein said function comprises an integral expression of said error datum.

5. A programmable robot according to claim 1, wherein said memory means are responsive to said first external action to store said command datum that is available at the moment when said first external action takes place.

6. A programmable robot, including at least one movable member which is displaceable with respect to a reference position in the direction of a corresponding degree of freedom and at least one corresponding control unit, said at least one control unit comprising a sensor responsive to the position of said movable member with respect to the reference position to furnish a positional datum representing the position of the movable member; a control system comprising means for producing a command datum and means responsive to said positional and command data to calculate an error datum and to produce a control signal the amplitude of which is a function of the error datum, said function comprises an integral expression of said error datum, said function has the form $a_1+a_2+a_3(d/dt)+a_0 \int dt$ where $a_0$, $a_1$, $a_2$ and $a_3$ are constant parameters, an actuator responsive to said control signal to displace said movable member with respect to said reference position, so as to tend to eliminate the error; memory means responsive to a first external action to store said positional datum of the movable member; and mode-selecting means responsive to a second external action for selectively enabling a training mode of said control system wherein said command datum used for the calculation of said error datum is kept constant during each interval of time between two consecutive ones of successive instants, at each of them said command datum is rendered identical with said positional datum.

7. A programmable robot, including at least one movable member which is displaceable with respect to a reference position in the direction of a corresponding degree of freedom and at least one corresponding control unit, said at least one control unit comprising a sensor responsive to the position of said movable member with respect to the reference position to furnish a positional datum representing the position of the movable member; a control system comprising means for producing a command datum and means responsive to said positional and command data to calculate an error datum and to produce a control signal the amplitude of which is a function of the error datum, said control system comprises calculating means responsive to said positional datum, said command datum and a standard time signal, to calculate said error datum and then the numerical value of the said function comprising a term proportional to the error datum plus an integral expression of said error datum, an actuator responsive to said control signal to displace said movable member with respect to said reference position, so as to tend to eliminate the error; memory means responsive to a first external action to store said positional datum of the movable member; and mode-selecting means responsive to a second external action for selectively enabling a training mode of said control system wherein said command datum used for the calculation of said error datum is kept constant during each interval of time between two consecutive ones of successive instants at each of them said command datum is rendered identical with said positional datum.

8. A programmable robot according to claim 7, wherein said function has the form $$a_1 + a_2\epsilon + a_3 \frac{d\epsilon}{dt} + a_0 \int \epsilon \, dt$$

where $a_0$, $a_1$, $a_2$ and $a_3$ are constant parameters.

* * * * *